(12) United States Patent
Han et al.

(10) Patent No.: US 9,859,734 B2
(45) Date of Patent: Jan. 2, 2018

(54) POWER SUPPLY CIRCUIT AND POWER SUPPLY METHOD

(71) Applicants: Boe Technology Group Co., Ltd., Beijing (CN); Beijing Boe Energy Technology Co., Ltd., Beijing (CN)

(72) Inventors: Xiaoyan Han, Beijing (CN); Qingmeng Wang, Beijing (CN); Kunkun Fang, Beijing (CN)

(73) Assignees: BOE TECHNOLOGY GROUP CO., LTD., Beijing (CN); BEIJING BOE ENERGY TECHNOLOGY CO., LTD., Beijing (CN)

( * ) Notice: Subject to any disclaimer, the term of this patent is extended or adjusted under 35 U.S.C. 154(b) by 132 days.

(21) Appl. No.: 14/913,311

(22) PCT Filed: Aug. 21, 2015

(86) PCT No.: PCT/CN2015/087756
§ 371 (c)(1),
(2) Date: Feb. 19, 2016

(87) PCT Pub. No.: WO2016/161746
PCT Pub. Date: Oct. 13, 2016

(65) Prior Publication Data
US 2017/0040816 A1    Feb. 9, 2017

(30) Foreign Application Priority Data

Apr. 9, 2015  (CN) .......................... 2015 1 0166875

(51) Int. Cl.
*H02M 3/158* (2006.01)
*H02M 3/335* (2006.01)
(Continued)

(52) U.S. Cl.
CPC ............ *H02J 7/0052* (2013.01); *H02J 7/007* (2013.01); *H02J 7/0093* (2013.01);
(Continued)

(58) Field of Classification Search
CPC ...... H02J 7/0093; H02M 3/156; H02M 3/158; H02M 3/1588; H02M 2001/346; H02M 1/4225
(Continued)

(56) References Cited

U.S. PATENT DOCUMENTS 5,510,974 A * 4/1996 Gu ...................... H02M 1/4258
363/134
6,051,961 A * 4/2000 Jang ...................... H02M 3/158
323/224
(Continued)

FOREIGN PATENT DOCUMENTS

CN          1710793        12/2005
CN         202616997       12/2012
(Continued)

OTHER PUBLICATIONS

International Search Report and Written Opinion from PCT/CN15/87756 dated Jan. 7, 2016.
(Continued)

*Primary Examiner* — Samuel Berhanu
*Assistant Examiner* — Tarikh Rankine
(74) *Attorney, Agent, or Firm* — Calfee, Halter & Griswold LLP

(57) ABSTRACT

The present invention provides a power supply circuit and a power supply method. The power supply circuit comprises: a charge control unit, a battery and battery protection unit, a voltage stabilizing unit and a voltage boosting unit; the voltage boosting unit comprises: a consumption reducing module for, at the moment of turning on or turning off a
(Continued)

power device in the voltage boosting unit, enabling an electric current flowing through the power device to be zero. The present invention, by arranging the consumption reducing module, enables an electric current flowing through the power device to be zero at the moment of turning on or turning off the power device in the voltage boosting unit, which realizes zero current turn-on or turn-off of the power device, and reduces consumption of the electric energy.

8 Claims, 2 Drawing Sheets

(51) Int. Cl.
  *H02J 7/00*    (2006.01)
  *H02M 1/42*    (2007.01)
  *H02M 3/156*   (2006.01)
  *H02M 1/00*    (2006.01)
  *H02M 1/34*    (2007.01)

(52) U.S. Cl.
  CPC ........... *H02M 3/156* (2013.01); *H02J 7/0042* (2013.01); *H02J 2007/0059* (2013.01); *H02M 3/158* (2013.01); *H02M 3/1588* (2013.01); *H02M 3/335* (2013.01); *H02M 2001/0058* (2013.01); *H02M 2001/346* (2013.01); *Y02B 40/90* (2013.01); *Y02B 70/1491* (2013.01)

(58) Field of Classification Search
  USPC .......................... 320/107; 323/235, 271, 282
  See application file for complete search history.

(56) References Cited

U.S. PATENT DOCUMENTS

| | | | |
|---|---|---|---|
| 2006/0028186 A1* | 2/2006 | Yan | H02M 3/155 323/225 |
| 2006/0267561 A1* | 11/2006 | Domb | G05F 1/70 323/222 |
| 2010/0202173 A1* | 8/2010 | Storm | H02M 1/06 363/126 |
| 2010/0237843 A1* | 9/2010 | Rivet | H02M 1/16 323/282 |
| 2012/0293152 A1* | 11/2012 | Gao | H02M 3/156 323/311 |
| 2013/0300390 A1* | 11/2013 | Lee | H02M 3/1563 323/282 |

FOREIGN PATENT DOCUMENTS

| | | | |
|---|---|---|---|
| CN | 102916456 | | 2/2013 |
| CN | 103441551 | | 12/2013 |
| CN | 103595248 | | 2/2014 |
| CN | 103684030 | | 3/2014 |
| CN | 103746423 | | 4/2014 |
| CN | 204012830 U | * | 12/2014 |
| CN | 104348361 | | 2/2015 |
| CN | 104734302 | | 6/2015 |
| JP | 2004312867 | | 11/2004 |

OTHER PUBLICATIONS

Office action from Chinese Application No. 201510166875.3 dated Jul. 6, 2016.
International Search Report and Written Opinion from PCT/CN15/87556 dated Jan. 7, 2016.

\* cited by examiner

POWER SUPPLY CIRCUIT AND POWER SUPPLY METHOD

RELATED APPLICATIONS

The present application is the U.S. national phase entry of PCT/CN2015/087756 with an International filing date of Aug. 21, 2015, which claims the benefit of Chinese Application No. 201510166875.3, filed Apr. 9, 2015, the entire disclosures of which are incorporated herein by reference.

FIELD OF THE INVENTION

The present invention relates to the field of power supply technology, particularly to a power supply circuit and a power supply method.

BACKGROUND OF THE INVENTION

With the development of science and technology, electronic devices such as mobile phones and tablet computers have become indispensible things in people's life. However, the built-in batteries of these electronic devices have limited capacities, which may bring inconvenience to people's use sometimes. The mobile power supply as a portable charger has the advantages of having a small volume and being safe and reliable, and can charge the device at any time and any place.

The mobile power supply in the current market generally takes the lithium battery as the energy storage unit, and charges the lithium battery through an AC power supply. When the mobile power supply is used, the lithium battery charges the electronic device via a voltage boosting unit.

The above mobile power supply at least has the following defect: when the mobile power supply charges the electronic device, there will be a part of electric energy consumed within the mobile power supply, which results in a relatively large energy consumption.

SUMMARY OF THE INVENTION

In order to solve the problem in the prior art that when the mobile power supply charges the electronic device, there will be a part of electric energy consumed within the mobile power supply, which results in a relatively large energy consumption, the present invention provides a power supply circuit and a power supply method.

According to a first aspect of the present invention, a power supply circuit is provided, the power supply circuit comprising: a charge control unit, a battery and battery protection unit, a voltage stabilizing unit and a voltage boosting unit. The voltage boosting unit comprises: a consumption reducing module for, at the moment of turning on or turning off a power device in the voltage boosting unit, enabling an electric current flowing through the power device to be zero.

According to an embodiment, the power device comprises a first transistor and a second transistor.

The voltage boosting unit comprises a third inductor, a first diode, a first transistor and the consumption reducing module. The consumption reducing module comprises a first inductor, a second inductor, a first capacitor, a second diode, a third diode, a fourth diode and a second transistor.

A first end of the third inductor is connected with an input terminal of the voltage boosting unit, a second end of the third inductor is connected with a first node.

A first end of the second inductor is connected with the first node, a second end of the second inductor is connected with a positive electrode of the second diode, a negative electrode of the second diode is connected with a second node.

A first electrode of the first transistor is connected to the ground and is connected with a positive electrode of the first diode, a second electrode of the first transistor is connected with the first node, a negative electrode of the first diode is connected with the first node, a gate of the first transistor is connected with a first signal control terminal.

A first electrode of the second transistor is connected to the ground, a second electrode of the second transistor is connected with the second node, a gate of the second transistor is connected to a second signal control terminal.

A first end of the first inductor is connected with the second node, a second end of the first inductor is connected with a positive electrode of the third diode.

A positive electrode of the fourth diode is connected with the second node, a negative electrode of the fourth diode is connected with a negative electrode of the third diode.

A first end of the first capacitor is connected with a positive electrode of the third diode, a second end of the first capacitor is connected with a negative electrode of the third diode, the negative electrode of the third diode is connected with a third node, the third node is a voltage boosting output terminal.

According to an embodiment, the voltage boosting unit further comprises a filter module for filtering a signal outputted by the voltage boosting output terminal. An input terminal of the filter module is connected with the voltage boosting output terminal, an output terminal of the filter module is connected with an output terminal of the voltage boosting unit.

According to an embodiment, the filter module comprises a second capacitor, a third capacitor and a fourth inductor.

A first end of the second capacitor is connected with the voltage boosting output terminal, a second end of the second capacitor is connected to the ground.

A first end of the fourth inductor is connected with the voltage boosting output terminal, a second end of the fourth inductor is connected with a first end of the third capacitor.

The first end of the third capacitor is connected with the output terminal of the voltage boosting unit, a second end of the third capacitor is connected to the ground.

According to an embodiment, the second capacitor is an electrolytic capacitor, the first end of the second capacitor is a positive end.

According to a second aspect of the present invention, a power supply method is provided, for use in a power supply circuit provided by the first aspect of the present invention. The power supply circuit comprises: a charge control unit, a battery and battery protection unit, a voltage stabilizing unit and a voltage boosting unit; the voltage boosting unit comprising a consumption reducing module. The method comprises: when an input terminal of the voltage boosting unit is inputted with an electric current, at the moment of turning on or turning off a power device in the voltage boosting unit, enabling an electric current flowing through the power device to be zero through the consumption reducing module.

According to a third aspect of the present invention, a power supply method is provided for use in the power supply circuit provided by any of the above embodiments, the method comprising:

at a first phase ($t_1$-$t_2$), controlling the first signal control terminal to enable the first transistor to be turned on, and controlling the second signal control terminal to keep the second transistor to be turned off; at a second phase ($t_2$-$t_3$), controlling the first signal control terminal to keep the first transistor to be turned on, and controlling the second signal control terminal to keep the second transistor to be turned off;

at a third phase ($t_3$-$t_4$), controlling the first signal control terminal to keep the first transistor to be turned on, and controlling the second signal control terminal to enable the second transistor to be turned on;

at a fourth phase ($t_4$-$t_5$), controlling the first signal control terminal to keep the first transistor to be turned on, and controlling the second signal control terminal to enable the second transistor to be turned off;

at a fifth phase ($t_5$-$t_6$), controlling the first signal control terminal to enable the first transistor to be turned off, and controlling the second signal control terminal to keep the second transistor to be turned off;

at a sixth phase ($t_6$-$t_7$), controlling the first signal control terminal to keep the first transistor to be turned off, and controlling the second signal control terminal to keep the second transistor to be turned off.

The power supply circuit and the power supply method provided by the present invention, by arranging the consumption reducing module in the voltage boosting unit, enable an electric current flowing through a power device to be zero at the moment of turning on or turning off the power device in the voltage boosting unit, which realizes zero current turn-on or turn-off of the power device, and reduces consumption of the electric energy. This solves the problem in the prior art that when the mobile power supply charges the electronic device, there will be a part of electric energy consumed within the mobile power supply, which results in a relatively large energy consumption, thereby achieving the effect of reducing electric energy consumed within the mobile power supply.

It should be understood that the above general description and the subsequent detail description are only exemplary and explanatory, and cannot limit the present invention.

BRIEF DESCRIPTION OF THE DRAWINGS

The drawings herein are incorporated into the description and constitute part of the description, which show embodiments that comply with the present invention and are used for explaining the principle of the present invention in cooperation with the description.

Figure 1:
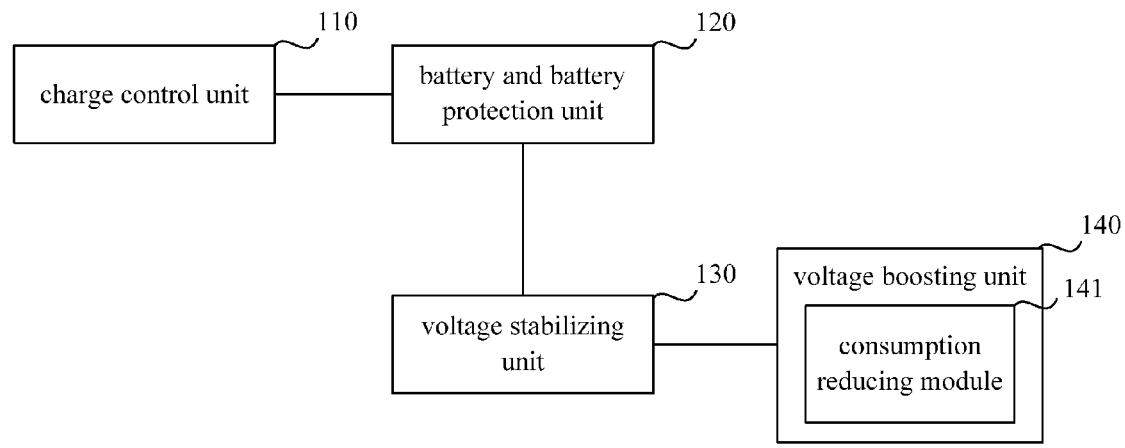
FIG. 1 is a schematic view of a power supply circuit shown according to an exemplary embodiment.

The exemplary embodiments of the present invention shown in the above drawings will be described in more details subsequently. These drawings and literal descriptions are not used for limiting the scope of the concept of the present invention in any way, but explaining the concept of the present invention for the skilled person in the art by making reference to particular embodiments.

DETAILED DESCRIPTION OF THE INVENTION

Next, the exemplary embodiments will be explained in detail, the examples thereof are indicated in the drawings. When the following description relates to the drawings, unless otherwise indicated, the same number in different drawings represents the same or similar element. The implementing modes described in the following exemplary embodiments do not represent all implementing modes consistent with the present invention. On the contrary, they are only examples of devices and methods consistent with some aspects of the present invention.

The transistors used in all the embodiments of the present invention can all be thin film transistors or field effect transistors or other devices with the same properties. According to the function in the circuit, the transistors used in the embodiments of the present invention are mainly switch transistors. Since the source and the drain of the switch transistor used here are symmetric, the source and the drain thereof can be interchanged. In the embodiments of the present invention, in order to distinguish the two electrodes in addition to the gate of the transistor, the source thereof is called the first electrode, the drain is called the second electrode. It is prescribed according to the form in the drawing that the middle end of the transistor is the gate. In addition, the switch transistors used in the embodiments of the present invention can include P-type switch transistors and N-type switch transistors. The P-type switch transistors are turned on when the gate is of a low level and cut off when the gate is of a high level. The N-type switch transistors are turned on when the gate is of a high level and cut off when the gate is of a low lever.

FIG. 1 is a schematic view of a power supply circuit shown according to an exemplary embodiment, this embodiment is illustrated by taking the example that the power supply circuit is applied in a mobile power supply. The power supply circuit can comprise: a charge control unit 110, a battery and battery protection unit 120, a voltage stabilizing unit 130 and a voltage boosting unit 140.

The voltage boosting unit 140 comprises a consumption reducing module 141 for, at the moment of turning on or turning off a power device in the voltage boosting unit 140, enabling an electric current flowing through the power device to be zero.

To sum up, the power supply circuit provided by the embodiment of the present invention, by arranging the consumption reducing module in the voltage boosting unit, enables an electric current flowing through a power device to be zero at the moment of turning on or turning off the power device in the voltage boosting unit, which realizes zero current turn-on or turn-off of the power device, and reduces consumption of the electric energy. This solves the problem in the prior art that when the mobile power supply charges the electronic device, there will be a part of electric energy consumed within the mobile power supply, which results in a relatively large energy consumption, thereby achieving the effect of reducing electric energy consumed within the mobile power supply.

Figure 2:
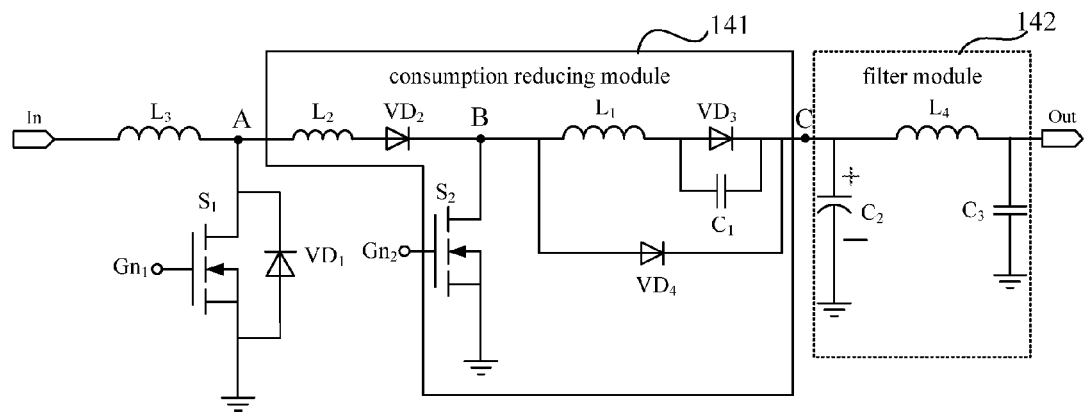
FIG. 2 is a circuit schematic view of a voltage boosting unit in the power supply circuit shown in FIG. 1.

FIG. 2 is a circuit schematic view of a voltage boosting unit in the power supply circuit shown in FIG. 1. The circuit schematic view adds a more preferable structure on the basis of the power supply circuit as shown in FIG. 1, thereby enabling the power supply circuit provided by the embodiment of the present invention to have a better performance.

Referring to FIG. 2, the power device comprises a first transistor $S_1$ and a second transistor $S_2$.

The voltage boosting unit comprises a third inductor $L_3$, a first diode $VD_1$, a first transistor $S_1$ and the consumption reducing module 141. The consumption reducing module 141 comprises a first inductor $L_1$, a second inductor $L_2$, a first capacitor $C_1$, a second diode $VD_2$, a third diode $VD_3$, a fourth diode $VD_4$ and a second transistor $S_2$.

A first end of the third inductor $L_3$ is connected with an input terminal In of the voltage boosting unit, a second end of the third inductor $L_3$ is connected with a first node A.

A first end of the second inductor $L_2$ is connected with the first node A, a second end of the second inductor $L_2$ is connected with a positive electrode of the second diode $VD_2$, a negative electrode of the second diode $VD_2$ is connected with a second node B. The second inductor $L_2$ can be a saturation inductor.

A first electrode of the first transistor $S_1$ is connected to the ground and is connected with a positive electrode of the first diode $VD_1$, a second electrode of the first transistor $S_1$ is connected with the first node A, a negative electrode of the first diode $VD_1$ is connected with the first node A, a gate of the first transistor $S_1$ is connected with a first signal control terminal $Gn_1$.

A first electrode of the second transistor $S_2$ is connected to the ground, a second electrode of the second transistor $S_2$ is connected with the second node B, a gate of the second transistor $S_2$ is connected to a second signal control terminal $Gn_2$.

The first transistor S1 and the second transistor S2 can be metal oxide semiconductor field effect transistors.

A first end of the first inductor $L_1$ is connected with the second node B, a second end of the first inductor $L_1$ is connected with a positive electrode of the third diode $VD_3$. The first inductor $L_1$ can be a saturation inductor.

It needs to be explained that the first inductor $L_1$ and the second inductor $L_2$ can restrain current spikes generated in reverse recovery of the first diode $VD_1$ and the second diode $VD_2$.

A positive electrode of the fourth diode $VD_4$ is connected with the second node B, a negative electrode of the fourth diode $VD_4$ is connected with a negative electrode of the third diode $VD_3$.

A first end of the first capacitor $C_1$ is connected with a positive electrode of the third diode $VD_3$, a second end of the first capacitor $C_1$ is connected with a negative electrode of the third diode $VD_3$, the negative electrode of the third diode $VD_3$ is connected with a third node C, the third node C is a voltage boosting output terminal.

The voltage boosting unit further comprises a filter module 142 for filtering a signal outputted by the voltage boosting output terminal (namely the third node C). An input terminal of the filter module 142 is connected with the voltage boosting output terminal (the third node C). An output terminal of the filter module 142 is connected with an output terminal Out of the voltage boosting unit.

The filter module 142 comprises a second capacitor $C_2$, a third capacitor $C_3$ and a fourth inductor $L_4$.

A first end of the second capacitor $C_2$ is connected with the voltage boosting output terminal (the third node C), a second end of the second capacitor $C_2$ is connected to the ground.

A first end of the fourth inductor $L_4$ is connected with the voltage boosting output terminal (the third node C), a second end of the fourth inductor $L_4$ is connected with a first end of the third capacitor $C_3$.

The first end of the third capacitor $C_3$ is connected with the output terminal Out of the voltage boosting unit, a second end of the third capacitor $C_3$ is connected to the ground.

The second capacitor $C_2$ can be an electrolytic capacitor, the first end of the second capacitor $C_2$ is a positive end, the negative end of the second capacitor $C_2$ is connected to the ground. The electrolytic capacitor has a relatively large capacitance, which can, in cooperation with the LC filter circuit (a circuit consisting of the third capacitor $C_3$ and the fourth inductor $L_4$), control the ripple wave (the AC component in the DC voltage) of the voltage outputted by the output terminal Out of the voltage boosting unit within 50 mV.

It needs to be explained additionally that the power supply circuit provided by the embodiment of the present invention, by arranging a filter module in the voltage boosting unit, filters the voltage outputted by the voltage boosting unit, and further increases the utilization rate of the electric quantity in the mobile power supply by reducing the voltage ripple wave.

Figures 3, 4:
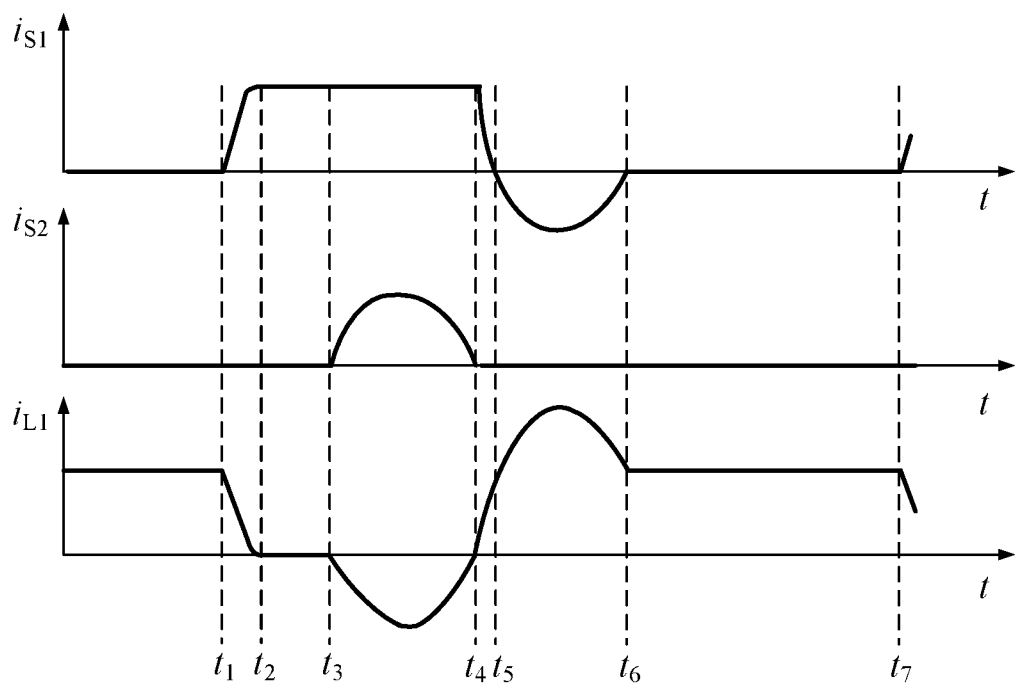
FIG. 3 is a flow chart of a power supply method shown according to an exemplary embodiment.
FIG. 4 is a current waveform diagram of a current flowing through a first transistor, a current flowing through a second transistor and a current flowing through a first inductor in the power supply circuit shown in FIG. 2.

FIG. 3 is a flow chart of a power supply method shown according to an exemplary embodiment, for use in the power supply circuit provided by the embodiment as shown in FIG. 1, the method comprising:

Step 301, when an input terminal of the voltage boosting unit is inputted with an electric current, at the moment of turning on or turning off a power device in the voltage boosting unit, enabling an electric current flowing through the power device to be zero through the consumption reducing module.

The power supply method shown according to the exemplary embodiment is used in the power supply circuit provided by the embodiment as shown in FIG. 2, the method comprising:

at a first phase ($t_1$-$t_2$), controlling the first signal control terminal to enable the first transistor to be turned on, and controlling the second signal control terminal to keep the second transistor to be turned off;

at a second phase ($t_2$-$t_3$), controlling the first signal control terminal to keep the first transistor to be turned on, and controlling the second signal control terminal to keep the second transistor to be turned off;

at a third phase ($t_3$-$t_4$), controlling the first signal control terminal to keep the first transistor to be turned on, and controlling the second signal control terminal to enable the second transistor to be turned on;

at a fourth phase ($t_4$-$t_5$), controlling the first signal control terminal to keep the first transistor to be turned on, and controlling the second signal control terminal to enable the second transistor to be turned off;

at a fifth phase ($t_5$-$t_6$), controlling the first signal control terminal to enable the first transistor to be turned off, and controlling the second signal control terminal to keep the second transistor to be turned off;

at a sixth phase ($t_6$-$t_7$), controlling the first signal control terminal to keep the first transistor to be turned off, and controlling the second signal control terminal to keep the second transistor to be turned off.

Specifically, as shown in FIG. 4, it shows a current waveform diagram of a current $i_{s1}$ flowing through the first transistor, a current $i_{s2}$ flowing through the second transistor and a current $i_{L1}$ flowing through the first inductor in the power supply circuit provided by the embodiment as shown in FIG. 2, wherein the lateral axis represents time, the vertical axis represents size of the current. In FIG. 4:

At the first moment t1, the input terminal of the voltage boosting unit is inputted with a current, and the first transistor and the second transistor are kept to be turned off through the first signal control terminal and the second signal control terminal. The currents flowing through the first transistor and the second transistor are zero, the current flowing through the first inductor and the current inputted at the input terminal of the voltage boosting unit are equal.

From the first moment $t_1$ to the second moment $t_2$, the first transistor is enabled to be turned on through the first signal control terminal. The current flowing through the first transistor begins to increase from zero, the current flowing through the first inductor begins to decrease.

At the second moment $t_2$, the current flowing through the first transistor and the current inputted at the input terminal of the voltage boosting unit are equal, the current flowing through the first inductor is zero.

From the second moment $t_2$ to the third moment $t_3$, the first transistor is kept to be turned on, the second transistor, the first diode, the second diode, the third diode and the fourth diode are turned off.

At the third moment $t_3$, the second transistor is enabled to be turned on through the second signal control terminal, series resonance occurs between the first inductor and the first capacitor through the second transistor. The current flowing through the first inductor begins to decrease gradually from zero, the current flowing through the second transistor begins to increase from zero, and the sum of the current flowing through the second transistor and the current flowing through the first inductor is zero, so as to realize zero current turn-on of the second transistor.

At the fourth moment $t_4$, the current flowing through the first inductor begins to increase from zero, here the current flowing through the second transistor is zero, the second transistor is enabled to be turned off through the second signal control terminal, so as to realize zero current turn-off of the second transistor. After the second transistor is turned off, series resonance occurs between the first inductor and the first capacitor through the first transistor. The current flowing through the first inductor begins to increase from zero, the current flowing through the first transistor begins to decrease.

At the fifth moment $t_5$, the current flowing through the first inductor and the current inputted at the input terminal of the voltage boosting unit are equal, the current flowing through the first transistor is zero. Here the first transistor is enabled to be turned off through the first signal control terminal, so as to realize zero current turn-off of the first transistor. The series resonance occurs between the first inductor and the first capacitor through the first diode.

At the sixth moment $t_6$, the current flowing through the first inductor and the current inputted at the input terminal of the voltage boosting unit are equal, the first diode is turned off naturally.

From the sixth moment $t_6$ to the seventh moment $t_7$, the current inputted at the input terminal of the voltage boosting unit continuously flows through the second diode and the third diode.

At the seventh moment $t_7$, the first transistor is turned on with zero current, one period is completed, and proceed to the next period.

To sum up, the power supply method provided by the embodiment of the present invention, through a consumption reducing module arranged in the voltage boosting unit, enables an electric current flowing through a power device to be zero at the moment of turning on or turning off the power device in the voltage boosting unit, which realizes zero current turn-on or turn-off of the power device, and reduces consumption of the electric energy. This solves the problem in the prior art that when the mobile power supply charges the electronic device, there will be a part of electric energy consumed within the mobile power supply, which results in a relatively large energy consumption, thereby achieving the effect of reducing electric energy consumed within the mobile power supply.

What are stated above are only preferred embodiments of the present invention, not for limiting the present invention. Any modifications, equivalent replacements, and improvements made within the spirit and the principle of the present invention should be covered within the protection scope of the present invention.

The invention claimed is:

1. A power supply circuit, the power supply circuit comprises:
   a charge control unit, a battery and battery protection unit, a voltage stabilizing unit and a voltage boosting unit;
   the voltage boosting unit comprises: a consumption reducing module for, at the moment of turning on or turning off a power device in the voltage boosting unit, enabling an electric current flowing through the power device to be zero,
   wherein the power device comprises a first transistor and a second transistor,
   the voltage boosting unit comprises a third inductor, a first diode, the first transistor and the consumption reducing module,
   the consumption reducing module comprises a first inductor, a second inductor, a first capacitor, a second diode, a third diode, a fourth diode and the second transistor;
   a first end of the third inductor is connected with an input terminal of the voltage boosting unit, a second end of the third inductor is connected with a first node;
   a first end of the second inductor is connected with the first node, a second end of the second inductor is connected with a positive electrode of the second diode, a negative electrode of the second diode is connected with a second node;
   a first electrode of the first transistor is connected to the ground and is connected with a positive electrode of the first diode, a second electrode of the first transistor is connected with the first node, a negative electrode of the first diode is connected with the first node, a gate of the first transistor is connected with a first signal control terminal;
   a first electrode of the second transistor is connected to the ground, a second electrode of the second transistor is connected with the second node, a gate of the second transistor is connected to a second signal control terminal;
   a first end of the first inductor is connected with the second node, a second end of the first inductor is connected with a positive electrode of the third diode;
   a positive electrode of the fourth diode is connected with the second node, a negative electrode of the fourth diode is connected with a negative electrode of the third diode;
   a first end of the first capacitor is connected with a positive electrode of the third diode, a second end of the first capacitor is connected with a negative electrode of the third diode, the negative electrode of the third diode is connected with a third node, the third node is a voltage boosting output terminal.

2. The power supply circuit according to claim 1, wherein the voltage boosting unit further comprises a filter module for filtering a signal outputted by the voltage boosting output terminal, an input terminal of the filter module is connected with the voltage boosting output terminal, an output terminal of the filter module is connected with an output terminal of the voltage boosting unit.

3. The power supply circuit according to claim 2, wherein the filter module comprises a second capacitor, a third capacitor and a fourth inductor;

a first end of the second capacitor is connected with the voltage boosting output terminal, a second end of the second capacitor is connected to the ground;

a first end of the fourth inductor is connected with the voltage boosting output terminal, a second end of the fourth inductor is connected with a first end of the third capacitor;

the first end of the third capacitor is connected with the output terminal of the voltage boosting unit, a second end of the third capacitor is connected to the ground.

4. The power supply circuit according to claim 3, wherein the second capacitor is an electrolytic capacitor, the first end of the second capacitor is a positive end.

5. A power supply method, for use in a power supply circuit as claimed in claim 1, the method comprising:

at a first phase ($t_1$-$t_2$), controlling the first signal control terminal to enable the first transistor to be turned on, and controlling the second signal control terminal to keep the second transistor to be turned off;

at a second phase ($t_2$-$t_3$), controlling the first signal control terminal to keep the first transistor to be turned on, and controlling the second signal control terminal to keep the second transistor to be turned off;

at a third phase ($t_3$-$t_4$), controlling the first signal control terminal to keep the first transistor to be turned on, and controlling the second signal control terminal to enable the second transistor to be turned on;

at a fourth phase ($t_4$-$t_5$), controlling the first signal control terminal to keep the first transistor to be turned on, and controlling the second signal control terminal to enable the second transistor to be turned off;

at a fifth phase ($t_5$-$t_6$), controlling the first signal control terminal to enable the first transistor to be turned off, and controlling the second signal control terminal to keep the second transistor to be turned off;

at a sixth phase ($t_6$-$t_7$), controlling the first signal control terminal to keep the first transistor to be turned off, and controlling the second signal control terminal to keep the second transistor to be turned off.

6. The power supply method according to claim 5, wherein the voltage boosting unit further comprises a filter module for filtering a signal outputted by the voltage boosting output terminal, an input terminal of the filter module is connected with the voltage boosting output terminal, an output terminal of the filter module is connected with an output terminal of the voltage boosting unit.

7. The power supply method according to claim 6, wherein the filter module comprises a second capacitor, a third capacitor and a fourth inductor;

a first end of the second capacitor is connected with the voltage boosting output terminal, a second end of the second capacitor is connected to the ground;

a first end of the fourth inductor is connected with the voltage boosting output terminal, a second end of the fourth inductor is connected with a first end of the third capacitor;

the first end of the third capacitor is connected with the output terminal of the voltage boosting unit, a second end of the third capacitor is connected to the ground.

8. The power supply method according to claim 7, wherein the second capacitor is an electrolytic capacitor, the first end of the second capacitor is a positive end.

* * * * *